US006959480B2

(12) United States Patent
Wing et al.

(10) Patent No.: US 6,959,480 B2
(45) Date of Patent: Nov. 1, 2005

(54) APPARATUS, METHOD AND DEVICE FOR ATTACHING HYDROFORMED HANDLE TO AN APPLIANCE

(75) Inventors: Forrest F. Wing, Des Moines, IA (US); Thomas Edward Gose, Cedar Rapids, IA (US); Michael J. Eveland, Cedar Rapids, IA (US); Todd E. Kniffen, Williamsburg, IA (US)

(73) Assignee: Maytag Corporation, Newton, IA (US)

( * ) Notice: Subject to any disclaimer, the term of this patent is extended or adjusted under 35 U.S.C. 154(b) by 404 days.

(21) Appl. No.: 10/195,792

(22) Filed: Jul. 15, 2002

(65) Prior Publication Data

US 2003/0029021 A1 Feb. 13, 2003

Related U.S. Application Data

(60) Provisional application No. 60/305,758, filed on Jul. 16, 2001.

(51) Int. Cl.[7] .......... B23P 11/02

(52) U.S. Cl. .......... 29/525.02; 29/525.08; 29/525.11; 16/412

(58) Field of Search .......... 29/525.02, 525.08, 29/525.11; 16/412, 413, 436; 403/264; 312/405, 348.6; 296/214

(56) References Cited

U.S. PATENT DOCUMENTS

| | | | | | |
|---|---|---|---|---|---|
| 2,175,632 | A | * | 10/1939 | Maga | 16/422 |
| 2,396,194 | A | * | 3/1946 | Parsons | 16/444 |
| 2,459,658 | A | | 1/1949 | Klein | |
| 2,472,479 | A | | 6/1949 | Hoff | |
| 2,961,694 | A | * | 11/1960 | May | 16/412 |
| 3,182,367 | A | * | 5/1965 | Hamann et al. | 411/522 |
| 3,183,549 | A | * | 5/1965 | Hammesfahr | 16/442 |
| 3,426,385 | A | | 2/1969 | Gutshall | |
| 4,484,788 | A | | 11/1984 | L'Homme et al. | |
| 4,745,656 | A | * | 5/1988 | Revlett | 16/412 |
| 5,259,089 | A | * | 11/1993 | Baur et al. | 16/444 |
| 5,303,451 | A | * | 4/1994 | Graviss et al. | 16/412 |
| 5,402,553 | A | | 4/1995 | Goetz et al. | |
| 5,740,587 | A | | 4/1998 | Onai et al. | |
| 5,797,164 | A | | 8/1998 | Donagy | |
| 2004/0010888 | A1 | * | 1/2004 | Wing et al. | 16/436 |
| 2004/0226141 | A1 | * | 11/2004 | Yates et al. | 16/412 |

* cited by examiner

*Primary Examiner*—David P. Bryant
(74) *Attorney, Agent, or Firm*—McKee, Voorhees & Sease, P.L.C.

(57) ABSTRACT

An apparatus and method for securing a handle to a door includes a first clip fastened to the door, a second clip fastened to the door and a handle clamped to the door by the first and second clips. The clip has a flat surface with an aperture therethrough and two wings at one end. A bent or beveled portion at the other end of the flat surface allows the clip to clamp the inner wall of the handle. A fastener, such as a screw, is placed through the aperture in the clip and into the exterior surface of the door to secure the clip and the handle to the door.

10 Claims, 5 Drawing Sheets

APPARATUS, METHOD AND DEVICE FOR ATTACHING HYDROFORMED HANDLE TO AN APPLIANCE

CROSS-REFERENCE TO RELATED APPLICATIONS

This application claims priority to U.S. provisional patent application Ser. No. 60/305,758 entitled "Method of Attaching Hydroformed Handle to Refrigerator Door" filed on Jul. 16, 2001.

BACKGROUND OF THE INVENTION

The present invention relates generally to an apparatus and method for securing a handle to an appliance. More specifically and without limitation, the present invention relates to a clamp for attaching a hydroformed handle to a refrigerator door such that the clamping system cannot be seen.

There are numerous ways to attach a handle to a door. However, usually an observer or customer can see the clamping or securing system. Systems in which an observer cannot see the clamping/securing mechanism are usually complex and expensive to manufacture, requiring special material and hardware. For example, U.S. Pat. No. 5,797,164 to Donaghy discloses a door handle slidably secured to the face of the refrigerator door without an exposed mechanical clamping/securing device. However, in order for this system to operate correctly, several specialized parts are required, including a mounting button that is made out of either nylon or another material which will resiliently expand or stretch. Additionally, the handle in Donaghy requires a specially designed recess area that will accept screws. It is therefore desirable to simplify the assembly and minimize the number of specialized parts.

Moreover, when metal handles are desired, manufacturing specialized parts requires additional welding increasing manufacturing time and labor costs. There is therefore a need to make a clamping system designed especially for metallic handles so that a metal handle, once formed, needs no additional welding. Further, prior attempts at a hidden or unobservable securing device require substantial preparation to the appliance door. Frequently, specialized grooves or reinforcement pieces are added to aid in installation of a handle. Such modifications also increase cost and time of production. There is therefore a need for a clamping/securing system that minimizes or eliminates the need for additional modifications to the appliance door.

A general feature of the present invention is the provision of an apparatus and method for attaching a metal handle which overcomes the problems found in the prior art. Another feature of the present invention is the provision of an apparatus and method for attaching a metal handle to an appliance wherein an observer cannot see any securing hardware.

Another feature of the present invention is the provision of an apparatus and method for attaching a metal handle to an appliance wherein the door handle is easily installed.

Yet another feature of the present invention is the provision of an apparatus and method for attaching a metal handle to an appliance wherein the handle can be secured to the appliance while making a minimum number of modifications to the appliance door.

A further feature of the present invention is the provision of an apparatus and method for attaching a metal handle to an appliance that minimizes production time and costs.

These and other features and advantages of the present invention will become apparent from the following specification and claims.

BRIEF SUMMARY OF THE INVENTION

The present invention generally relates to a new apparatus and method for securing a handle to an appliance door. More specifically, the present invention is comprised of clips secured on a door that clamps a handle in place. Preferably, the clip is fastened by a screw, the handle is hydroformed metal, and the door is that of a refrigerator. The handle hides the clips, thus providing the advantage of a clamping system that an observer cannot see when looking at the handle. Another advantage of the present invention is the clip may be made as a single piece of metal, plastic or other suitable material. The clip generally has a flat body with an aperture in the middle and two or more wings. A bent or beveled portion is included to allow the clip to be able to secure the inner wall of the handle to the door. The present invention also involves a method for using the above-mentioned clamping system. This method provides the advantage of being able to easily clamp a handle to a door without having to see the clamping system. Thus, the present invention provides for advantages of using a metallic clamping system that a person cannot see when looking at the handle.

DETAILED DESCRIPTION OF THE INVENTION

Figure 1:
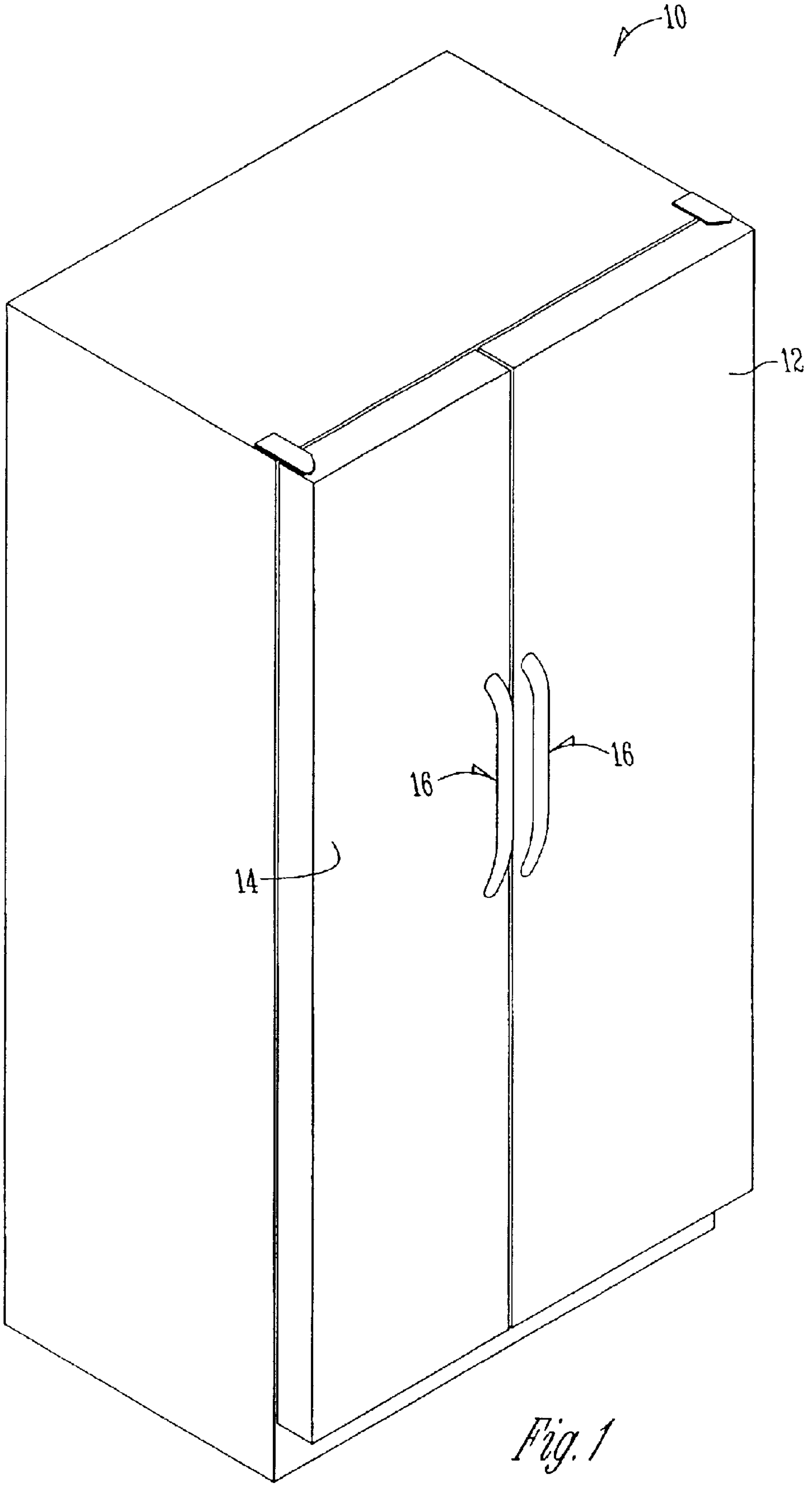
FIG. 1 illustrates an overall view of an exemplary appliance having handles attached to the doors using the present invention.

FIG. 1 illustrates an exemplary appliance, such as the refrigerator 10, being of the side-by-side style, having two doors 12 and 14. A handle 16 is secured to the doors 12, 14 and used for opening the doors 12, 14. The construction and attachment of the handles 16 to the doors 12, 14 will be understood in greater detail with reference to FIGS. 2–12.

Figure 5:
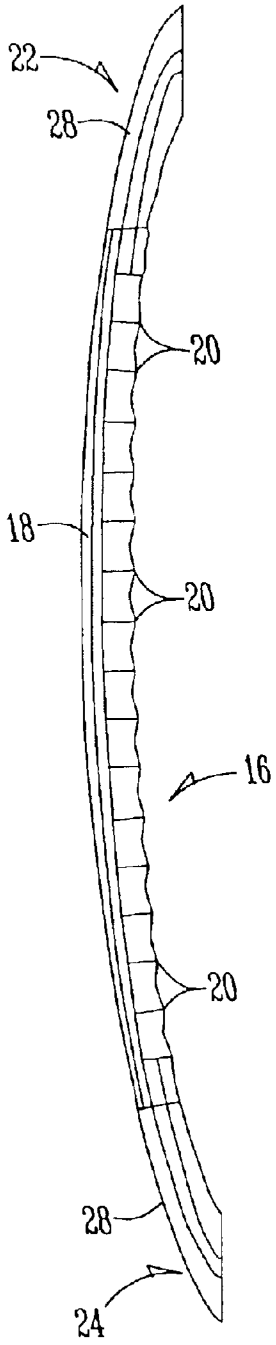
FIG. 5 is a side view of an illustrative handle.
Figure 6:
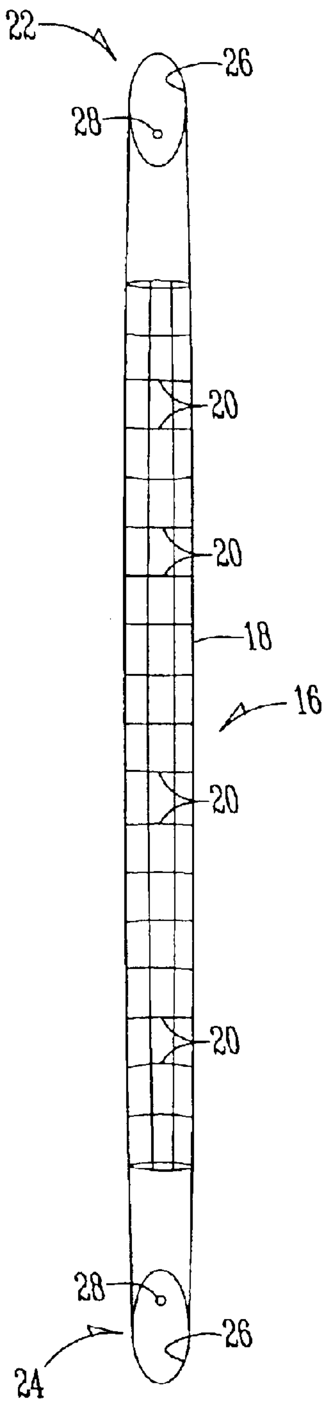
FIG. 6 is a rear side view of the handle shown in FIG. 5.

FIGS. 5 and 6 show the exemplary handle 16 that has been shaped, preferably through a hydroforming process to present a slightly curved tubular body 18 with gripping ridges 20. The body 18 has an upper end 22 and a lower end 24 that present openings 26 that will be placed flush upon the doors 12, 14. An access hole 28 at either end 22 or 24 may be drilled or otherwise formed to permit the insertion of a screwdriver or other tools (not shown).

Figure 2:
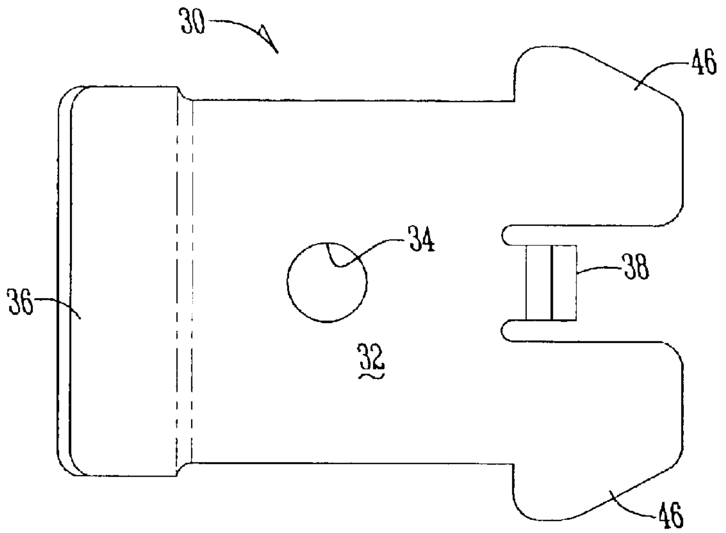
FIG. 2 is a plain view of an exemplary clip of the present invention.
Figure 3:
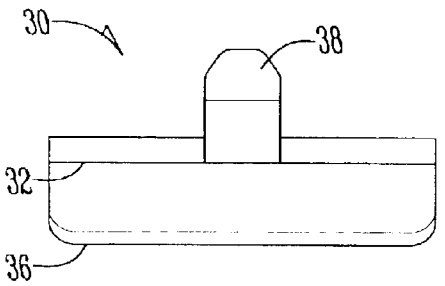
FIG. 3 is an end on view of the clip shown in FIG. 2.
Figure 4:
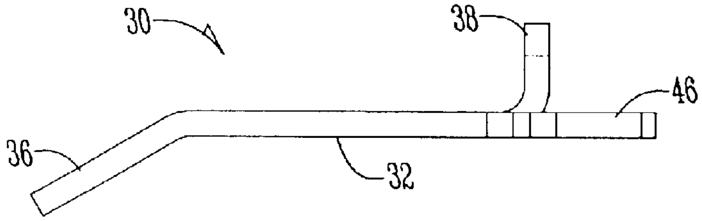
FIG. 4 is a side view of the securing clip shown in FIGS. 2 and 3.

The handle 16 is preferably secured to the doors 12, 14 using a pair of beveled retaining clips 30. Exemplary clip 30 is depicted in FIGS. 2, 3 and 4. The clip 30 provides a flat plate body 32 with an aperture 34 disposed therethrough. One end of the body 32 is bent at an angle to present a beveled portion 36. At the opposite end of the body 32, two wings 46 and a protrusion 38 departing from the body at an approximate 90° angle are present. The protrusion 38 minimizes vertical movement of the clip 30 during installation. The wings 46 generally conform with the width of the interior surface of the handle 16 to minimize side to side movement of handle 16.

Figure 9:
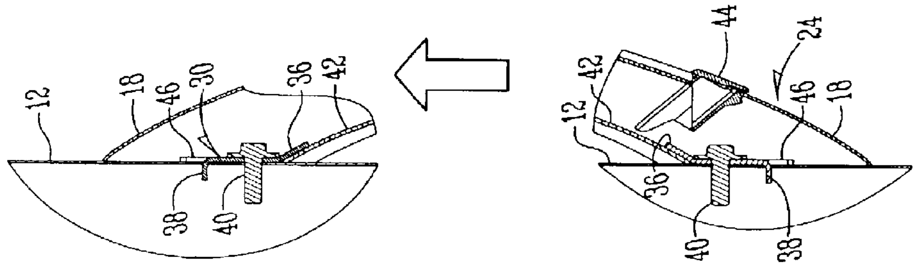
FIG. 9 is a cut away side view of the top and bottom portions of the handle during a final stage of affixing the handle to the door according to the present invention.
Figure 8:
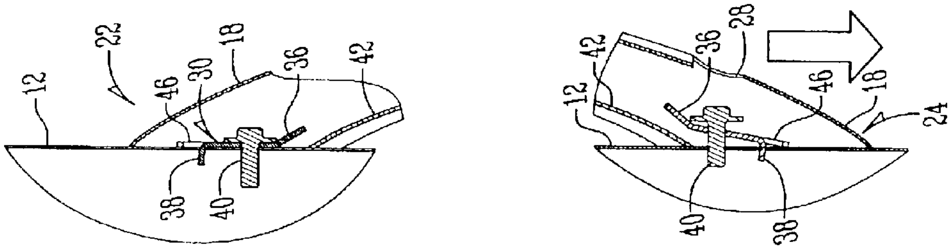
FIG. 8 is a cut away side view of the top and bottom portions of the handle during an intermediate stage of affixing the handle to the door according to the present invention.
Figure 7:
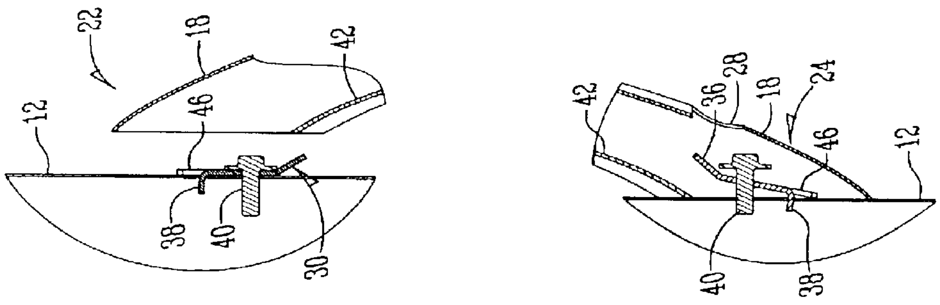
FIG. 7 is a cut away side view of the top and bottom portions of the handle during an initial stage of affixing the handle to the door according to the present invention.
Figure 10:
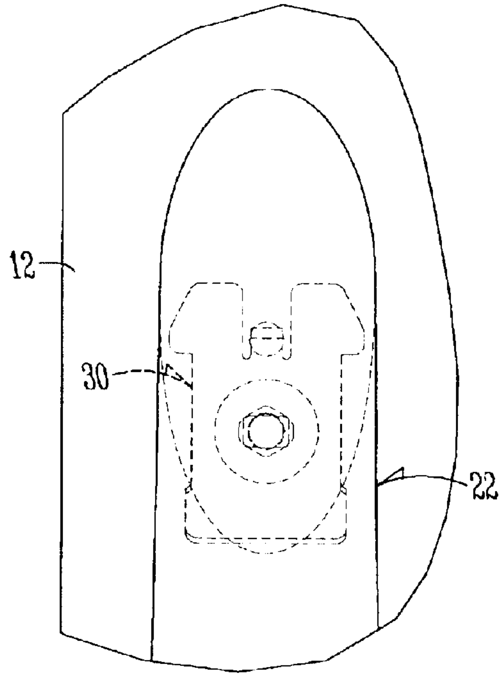
FIG. 10 is a front view, partially in phantom, depicting the connection between the upper end of the handle and the door.
Figure 11:
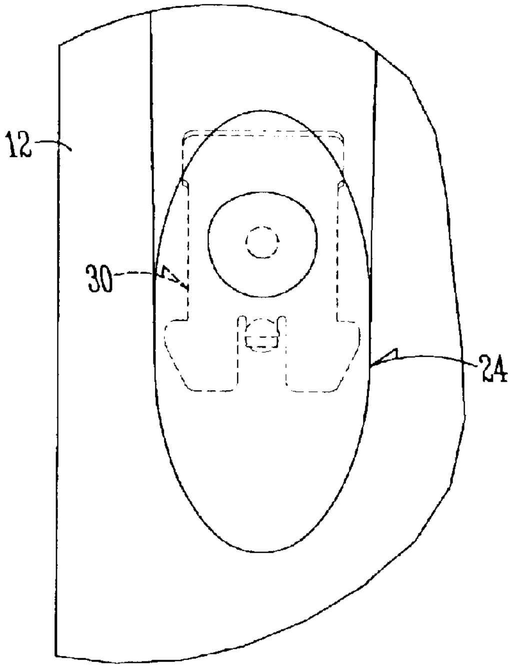
FIG. 11 is a front view, partially in phantom depicting the connection between the lower end of the handle and the door.

The method of attaching the handle 16 to a door 12 is best understood with reference to FIGS. 7–9 as well as 10–11. A clip 30 and fastener 40 are placed at upper and lower positions of the door 12, as FIGS. 7, 8 and 9 depict. The clips 30 are oriented on the door 12 by disposing the projection 38 through a matching opening in the door. A fastener 40 is placed through the aperture 34 of the clip 30 and then into the complementary sized hole in the door 12 as shown in FIG. 7. The handle 16 is then placed on the door 12 so that the top and bottom ends 22 and 24 are positioned over the upper and lower clips 30 as shown. Initially, the upper clip 30 is tightly secured to the door 12. The interior wall 42 of the handle body 18 is pushed beneath the beveled portion 36 of each clip 30. The lower fastener 40 is then tightened by inserting a screwdriver or other suitable tool (not shown) into the access hole 28 thereby clamping the interior wall 42 of the handle body 18 and securing the handle 16 in place. When the handle 16 is attached, the access hole 28 may be closed up by insertion of a plug 44. Removal of the handle 16 may be accomplished by reversing the above steps.

Thus, the present invention provides a stylish refrigerator door handle that is fastened directly to the refrigerator door surfaces and can be installed and removed easily with a minimum amount of hardware. Unlike many previous attachment techniques, there are no visible fasteners or mounting hardware, resulting in an elegant design. In addition, because handle 16 and clip 30 attach without welding a manufacturer can efficiently form and produce the handle 16 and clip 30.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method of securing a handle to a door, the door having an exposed exterior surface, the method comprising:

securing a first clip to the exterior surface of the door, the first clip including a beveled portion;

loosely securing a second clip to a second position on the exterior portion of the door, the second clip including a beveled portion;

positioning a handle onto the exterior surface of the door, the handle including a first end and a second end, each end having an exposed inner surface;

securing the inner surface of the first end of the handle underneath the beveled portion of the first clip;

securing the inner surface of the second end of the handle under the beveled portion of the loosely secured second clip; and securing the second clip to the exterior surface of the door.

2. The method of securing a handle to a door of claim 1 wherein the first clip is secured to the exterior surface of the door using a fastener.

3. The method of securing a handle to a door of claim 1 wherein the second clip is secured to the exterior surface of the door using a fastener.

4. The method of securing a handle to a door of claims 2 or 3 wherein the fastener is a screw.

5. The method of securing a handle to a door of claim 1 wherein the handle includes a hole in the second end.

6. The method of securing a handle to a door of claim 1 wherein the first clip includes a protruding lip.

7. The method of securing a handle to a door of claim 6 further comprising placing the lip of the first clip into a corresponding hole on the exterior surface of the door.

8. The method of securing a handle to a door of claim 1 wherein the second clip includes a protruding lip.

9. The method of securing a handle to a door of claim 8 further comprising placing the lip of the second clip into a corresponding hole on the exterior surface of the door.

10. The method of securing a handle to a door of claim 1 wherein the handle is a hydroformed metal handle.

* * * * *